No. 777,137. PATENTED DEC. 13, 1904.
T. PICKLES.
WEFT FORK AND WEFT FORK GRID IN LOOMS FOR WEAVING.
APPLICATION FILED MAR. 25, 1904.
NO MODEL.

Witnesses.
Arthur Gadd.
George Frederick Gadd.

Inventor
Thomas Pickles.
per William Gadd.
Attorney.

No. 777,137. Patented December 13, 1904.

UNITED STATES PATENT OFFICE.

THOMAS PICKLES, OF BURNLEY, ENGLAND.

WEFT-FORK AND WEFT-FORK GRID IN LOOMS FOR WEAVING.

SPECIFICATION forming part of Letters Patent No. 777,137, dated December 13, 1904.

Application filed March 25, 1904. Serial No. 200,055. (No model.)

*To all whom it may concern:*

Be it known that I, THOMAS PICKLES, a subject of the King of Great Britain, residing at Burnley, in the county of Lancaster, England, have invented new and useful Improvements in Weft-Forks and Weft-Fork Grids in Looms for Weaving, (for which I have made application for patent in Great Britain, No. 28,205, bearing date December 23, 1903,) of which the following is a specification.

The improvement relates to weft-forks and weft-fork grids in looms for weaving, and has for its object the operation of the weft-fork with a minimum of drag on the weft and with little liability to cut such weft or for the weft to cut into the material of the fork or grid in manner and by the means hereinafter to be described. To accomplish this and to effect my improvements, I form the prongs or tines of the weft-fork and also the grid of any suitable metal or substance, either with one, two, three, or more tines or prongs, as may be desirable, in the ordinary or other manner; but I clothe such tines or prongs or the wires or uprights of such grids, or the sides thereof, or the whole of these with some soft or clinging or frictional substance—such as india-rubber, gutta-percha, velvet, silk, cotton, or other fibrous substances—either by making such clothing in the form of sheaths or by wrapping with threads or otherwise. In the case of india-rubber and the like soluble substances the end may be accomplished by dipping the fork or grid into a solution thereof and where necessary vulcanizing the same in position. By these means the prongs or tines of the fork or the grid-bars, or both, are covered by a material which resists the pulling out from the shuttle of the weft, and so prevents the necessity of such fork entering the grid to the same distance as ordinary and to a large extent prevents damage to weft or weft-fork and grid-bars, which is often a present cause of difficulty in ordinary weaving. It is obvious that the whole of the parts named may be clothed or covered as described or that a portion only may be so treated, as found desirable.

That the invention may be better understood, reference may be made to the accompanying drawings, in which—

Figure 1:
Figure 2:
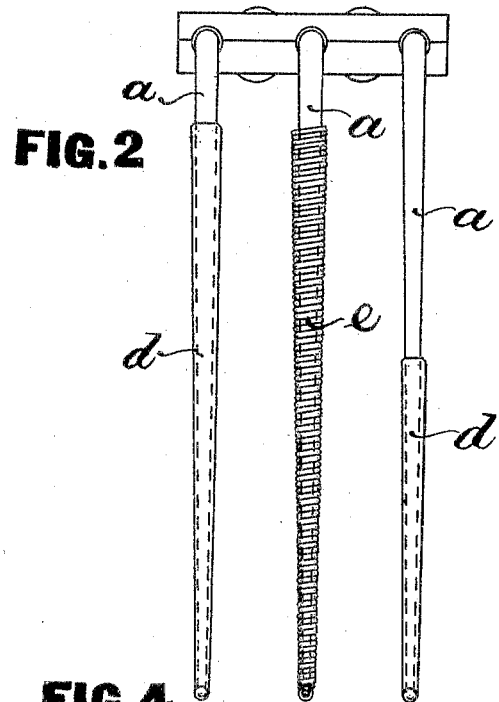
Figure 3:
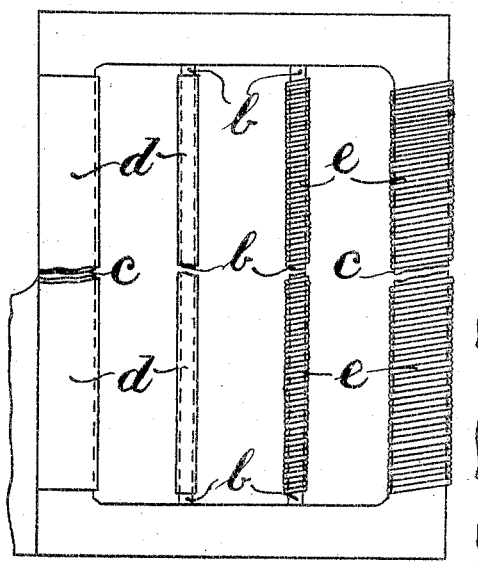
Figure 4:
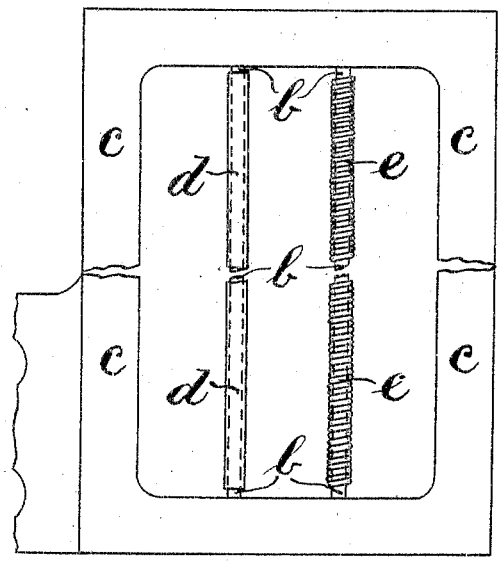

Figure 1 is a side elevation of the tine or prong portion of a weft-fork arranged in accordance with one form of my invention, and Fig. 2 is a front elevation of the like portion of a weft-fork arranged in accordance with various forms of my invention. Figs. 3 and 4 are front elevations of portions of weft-fork grids also arranged in accordance with various forms of my invention. The figures are shown enlarged for the sake of clearness.

$a$ $a$ are the tines or prongs of the weft-fork, and $b$ $b$ are the wires or uprights of the grids, while $c$ $c$ are the side portions of such grids.

$d$ $d$ are examples of clothing when used in the form of sheaths, and $e$ $e$ are examples of clothing when such clothing is accomplished by wrapping with threads.

Having now particularly described and ascertained the nature of my said invention and in what manner the same is to be performed, I declare that what I claim is—

A weft-fork apparatus for looms having fork-tines and grid-bars, and clothing upon said tines and bars, substantially as herein shown and described.

THOMAS PICKLES.

Witnesses:
 GEORGE FREDERICK GADD,
 ARTHUR GADD.